Patented Feb. 2, 1954

2,668,175

UNITED STATES PATENT OFFICE 2,668,175

PRODUCTION OF ACRYLONITRILE

Walter Reppe, Ludwigshafen (Rhine), Nikolaus v. Kutepow, Karlsruhe-Rueppurr, and Otto Leichtle, Ludwigshafen (Rhine), Germany, assignors to Badische Anilin- & Soda-Fabrik Aktiengesellschaft, Ludwigshafen (Rhine), Germany No Drawing. Application December 29, 1951, Serial No. 264,272

Claims priority, application Germany January 9, 1951

8 Claims. (Cl. 260—465.2)

This invention relates to a process for the production of acrylonitrile from acrylic acid and ammonia.

It is already known that saturated mono- and polycarboxylic acids and ammonia yield the corresponding nitriles when they are led at elevated temperature over catalysts capable of effecting the splitting off of water (hereinafter referred to as "water-removing catalysts").

In contrast thereto it was to be expected that unsaturated carboxylic acids, such as acrylic acid, by reason of the readiness with which ammonia adds on to the activated double linkage upon treatment with ammonia, would not yield acrylonitrile but rather addition products of ammonia to acrylic acid. Furthermore acrylic compounds, as it is well known, tend to polymerize at elevated temperatures.

We have found, contrary to expectation, that acrylonitrile can be obtained in good yields by leading mixtures of acrylic acid and ammonia in the gas phase at high temperatures, preferably above 200° C., over water-removing catalysts, for example phosphoric acid or phosphates, which advantageously are deposited on carriers.

The most favorable reaction temperature lies between 250° and 500° C., but the reaction also takes place outside the said temperature range.

Practically all the known water-removing catalysts may be used as catalysts for the process, as for example aluminum oxide, thorium oxide, aluminum silicate, aluminum borate, silica gel, and most advantageously free phosphoric acid, acid reacting phosphates, e. g. primary magnesium or calcium phosphate, boric acid or phosphates of all kinds, as for example acid and/or neutral alkali, ammonium, beryllium, aluminum, boron, titanium and like phosphates, salts of organic bases with phosphoric acids and, if desired, mixtures of phosphates and free phosphoric acid. The phosphoric acid and/or salts thereof may be used as catalysts either as such or deposited on carriers. Suitable carriers are silica gel, pumice, coke and the like.

The process may be carried out most simply in an externally heated vertical refined steel tube charged with the catalyst.

The acrylic acid is either vaporised in the upper part of the tube by impingement against a heated layer of catalyst carrier or "Raschig rings" located above the catalyst or is vaporised in a vaporiser connected to the upper end of the tube. Both the acrylic acid and the ammonia gas led into the tube, advantageously in about stoichiometrical proportions, are preferably separately preheated to the reaction temperature before they meet within the catalyst filling (about 10 to 20 centimetres below the surface of the catalyst).

In order to avoid any clogging of the initial material or end product in the tube, especially having regard to the polymerisability of acrylic acid, it is preferable to pass a weak current of indifferent gas, as for example nitrogen, hydrogen or carbon monoxide, through the tube and/or to apply a vacuum to the lower end of the tube.

The reaction may also be carried out in the presence of volatile solvents, as for example aromatic hydrocarbons or water. The addition of water, preferably about 10 to 30% with reference to the acrylic acid introduced, is especially suitable because of the increase in the yield of acrylonitrile.

The reaction product leaving the tube usually forms two layers upon condensation. The upper layer consists of acrylonitrile and the lower layer consists of a solution of ammonium acrylate and a little acrylonitrile in water. The ammonium acrylate can only be formed from the unreacted parts of the acrylic acid and ammonia at the lower end of the tube if the temperature falls below 200° C.

Acrylic acid may be set free from the ammonium acrylate by means of a strong acid and then recovered by distillation. Only a small fraction (about 5 to 15%) of the acrylic acid is lost during the said reaction by decomposition into gaseous cleavage products.

The process may be carried out discontinuously or continuously. It is advantageous to return the reaction products which have not been condensed at room temperature together with the diluent or carrier gas, which is led in a cycle to the reaction chamber.

The following examples will further illustrate this invention but the invention is not restricted to these examples.

Example 1

0.7 litre of a phosphoric acid-silicon gel catalyst (containing 20% of phosphoric acid) is charged into an electrically heated copper reaction tube of 1 litre capacity and heated to 380° C. in a current of nitrogen. Acrylic acid is dripped from a measuring vessel at the rate of 1.09 grammol per hour into a copper vaporiser heated to 250° C. and is led in the vapor phase by means of a current of nitrogen of 12 litres per hour through a heated tube and enters the reaction tube at about 300° C. Ammonia gas, metered by a valve, is led at the rate of 1 gram-mol per hour through an iron coil in which it is heated to 380° C. and is introduced at a point about 10 to 20 centimetres below the level of the catalyst through an iron tube passing through the top of the reaction tube into the mixture of acrylic acid and nitrogen flowing through the catalyst. The catalyst is kept at 380° C. In all there are supplied to the reaction tube during 3 hours 235 grams of 99% acrylic acid, 72 litres of ammonia and 36 litres of nitrogen. The reaction product (287 grams) is cooled to about room temperature and separates into two layers; the upper layer (125 grams) contains acrylonitrile and the lower layer (162 grams) contains ammonium acrylate and a little acrylonitrile and acrylic acid.

By separate distillation, the two layers yield in all 108 grams of pure acrylonitrile, corresponding to a yield of about 64%.

*Example 2*

Into a refined steel reaction tube of 5 litres capacity charged with 2.5 litres of phosphoric acid-silica gel catalyst containing 20% of phosphoric acid there are led at 350° C. during 14 hours 1830 grams of acrylic acid, employed in an 80% aqueous solution (with an hourly addition of 1.45 gram-mols of acrylic acid) and 504 litres of ammonia (1.49 mols per hour) and 210 litres of nitrogen (0.64 mol per hour). 1991 grams of crude reaction product are obtained from which by distillation as described in Example 1 615 grams of pure acrylonitrile are obtained, corresponding to a yield of about 58% of the theoretical yield.

*Example 3*

273 grams of 99% acrylic acid (1.25 mols per hour), 60 litres of ammonia (0.835 mol per hour) and 30 litres of nitrogen are passed over 0.7 litre of phosphoric acid-silica gel catalyst containing 20% of phosphoric acid in a copper reaction tube of 1 litre capacity for 3 hours at 350° C. 265 grams of a crude product are formed from which by distillation 109 grams of pure acrylonitrile are obtained, corresponding to a yield of about 55% with reference to the acrylic acid introduced.

*Example 4*

One litre of a catalyst of granular silica gel (grain size from 4 to 7 millimetres) which contains 30 per cent of primary magnesium phosphate is charged in an electrically heated reaction tube of refined steel fitted with an acrylic acid vaporiser and an ammonia preheater. When 1730 parts of 90 per cent acrylic acid and 430 parts of ammonia are carried to reaction in this tube at a temperature of 400° C., with the ammonia being about 15 per cent in excess, 830 parts of acrylonitrile are obtained in the course of 6 hours, which amounts to 72.5 per cent of the calculated yield.

What we claim is:

1. A process for the production of acrylonitrile which comprises leading acrylic acid and ammonia in the gas phase at elevated temperatures above 200° C. over a water-removing catalyst containing phosphoric acid, the acrylic acid and the ammonia being separately preheated at a temperature above 200° C. before bringing them together in contact with said catalyst.

2. A process for the production of acrylonitrile which comprises leading acrylic acid and ammonia in the gas phase at temperatures between 250° and 500° C. over a water-removing catalyst containing phosphoric acid, the acrylic acid and the ammonia being separately preheated at a temperature above 200° C. before bringing them together in contact with said catalyst.

3. A process for the production of acrylonitrile which comprises leading acrylic acid and ammonia in the gas phase at elevated temperatures above 200° C. over a water-removing catalyst containing a phosphate, the acrylic acid and the ammonia being separately preheated at a temperature above 200° C. before bringing them together in contact with said catalyst.

4. A process for the production of acrylonitrile which comprises leading acrylic acid and ammonia in the gas phase at elevated temperatures above 200° C. over a water-removing catalyst containing an acid reacting phosphate, the acrylic acid and the ammonia being separately preheated at a temperature above 200° C. before bringing them together in contact with said catalyst.

5. A process for the production of acrylonitrile which comprises leading acrylic acid and ammonia in the gas phase at elevated temperatures above 200° C. over a water-removing catalyst containing primary magnesium phosphate, the acrylic acid and the ammonia being separately preheated at a temperature above 200° C. before bringing them together in contact with said catalyst.

6. A process for the production of acrylonitrile which comprises leading acrylic acid and ammonia in the gas phase at a temperature above 200° C. over a water-removing catalyst containing a compound selected from the class consisting of phosphoric acid and a phosphate, the acrylic acid and the ammonia being separately preheated at a temperature above 200° C. before bringing them together in contact with the catalyst.

7. A process as claimed in claim 6 wherein the water-removing catalyst is deposited on a silica gel carrier.

8. A process for the production of acrylonitrile which comprises separately preheating acrylic acid and ammonia to a temperature above 250° C. and separately passing the preheated acrylic acid and ammonia into a catalyst bed and bringing them together within the catalyst bed while maintaining a temperature within the range of 250° C. to 500° C. in the catalyst, said catalyst comprising a water-removing catalyst from the group consisting of phosphoric acid and a phosphate.

WALTER REPPE.
NIKOLAUS v. KUTEPOW.
OTTO LEICHTLE.

References Cited in the file of this patent

UNITED STATES PATENTS

| Number | Name | Date |
|---|---|---|
| 2,132,849 | Greenewalt et al. | Oct. 11, 1938 |
| 2,334,192 | Handford | Nov. 16, 1943 |
| 2,373,190 | Kung | Apr. 10, 1945 |
| 2,375,005 | Kung | May 1, 1945 |
| 2,417,749 | Hagemeyer | Mar. 18, 1947 |
| 2,481,826 | Cosby | Sept. 13, 1949 |